(12) United States Patent
Lalani et al.

(10) Patent No.: US 10,650,337 B2
(45) Date of Patent: May 12, 2020

(54) TECHNICAL FIELD SERVICE INVENTORY MANAGEMENT

(71) Applicant: salesforce.com, inc., San Francisco, CA (US)

(72) Inventors: Roojuta Lalani, Fremont, CA (US); Tyler Shopshire, Berkeley, CA (US); Kavya Murali, Foster City, CA (US); Neeraj Ahuja, Fremont, CA (US); Sudhakara Reddy Peddi, Irvine, CA (US)

(73) Assignee: salesforce.com, inc., San Francisco, CA (US)

( * ) Notice: Subject to any disclaimer, the term of this patent is extended or adjusted under 35 U.S.C. 154(b) by 115 days.

(21) Appl. No.: 15/882,751

(22) Filed: Jan. 29, 2018

(65) Prior Publication Data

US 2019/0236504 A1    Aug. 1, 2019

(51) Int. Cl.
*G06Q 10/06* (2012.01)
*G06Q 10/08* (2012.01)

(52) U.S. Cl.
CPC ..... *G06Q 10/06315* (2013.01); *G06Q 10/087* (2013.01)

(58) Field of Classification Search
None
See application file for complete search history.

(56) References Cited

U.S. PATENT DOCUMENTS

| | | |
|---|---|---|
| 5,983,227 A | 11/1999 | Nazem et al. |
| 6,216,133 B1 | 4/2001 | Masthoff |
| 6,236,978 B1 | 5/2001 | Tuzhilin |
| 6,288,717 B1 | 9/2001 | Dunkle |
| 6,411,949 B1 | 6/2002 | Schaffer |
| 6,907,566 B1 | 6/2005 | McElfresh et al. |
| 7,062,502 B1 | 6/2006 | Kesler |
| 7,100,111 B2 | 8/2006 | McElfresh et al. |
| 7,269,590 B2 | 9/2007 | Hull et al. |
| 7,346,531 B2 * | 3/2008 | Jacobs ............. G06Q 10/02 705/7.15 |
| 7,373,599 B2 | 5/2008 | McElfresh et al. |
| 7,401,094 B1 | 7/2008 | Kesler |
| 7,406,501 B2 | 7/2008 | Szeto et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |

(Continued)

OTHER PUBLICATIONS

Final Office Action for U.S. Appl. No. 12/437,418, dated Apr. 16, 2012.

(Continued)

*Primary Examiner* — Mehmet Yesildag
(74) *Attorney, Agent, or Firm* — LKGlobal | Lorenz & Kopf, LLP

(57) ABSTRACT

A method for technical field service inventory management has been developed. A software platform manages product inventory for use by a field service technician. The platform creates objects for a work order, a product required, a location, an address/appointment, a product item, a product item transaction and a product item consumed. The product item consumed object is used to automatically update the status of product inventory as the product is used by the field service technician.

17 Claims, 3 Drawing Sheets

(56) References Cited

U.S. PATENT DOCUMENTS

| | | | |
|---|---|---|---|
| 7,644,122 B2 | 1/2010 | Weyer et al. | |
| 7,668,861 B2 | 2/2010 | Steven | |
| 7,747,648 B1 | 6/2010 | Kraft et al. | |
| 7,783,507 B2 * | 8/2010 | Schick | B61L 27/0094 705/7.11 |
| 7,827,208 B2 | 11/2010 | Bosworth et al. | |
| 7,840,434 B2 * | 11/2010 | Ingman | G06Q 10/06 705/7.16 |
| 7,853,881 B1 | 12/2010 | Aly Assal et al. | |
| 7,856,445 B2 | 12/2010 | Gross | |
| 7,945,653 B2 | 5/2011 | Zuckerberg et al. | |
| 7,991,764 B2 | 8/2011 | Rathod | |
| 8,005,896 B2 | 8/2011 | Cheah | |
| 8,073,850 B1 | 12/2011 | Hubbard et al. | |
| 8,103,611 B2 | 1/2012 | Tuzhilin et al. | |
| 8,150,913 B2 | 4/2012 | Cheah | |
| 8,166,013 B2 | 4/2012 | Bandaru et al. | |
| 8,266,066 B1 * | 9/2012 | Wezter | G06Q 10/10 705/78 |
| 8,612,276 B1 * | 12/2013 | Nielsen | G06Q 10/063118 705/7.16 |
| 8,948,355 B2 * | 2/2015 | Kosseifi | G06Q 10/06311 379/93.17 |
| 10,282,683 B2 * | 5/2019 | Mitchell | G06Q 10/06 |
| 2003/0055666 A1 * | 3/2003 | Roddy | B61L 27/0094 705/305 |
| 2003/0130820 A1 * | 7/2003 | Lane, III | G06Q 10/06 702/184 |
| 2004/0111313 A1 * | 6/2004 | Ingman | G06Q 10/06 705/7.16 |
| 2005/0222889 A1 * | 10/2005 | Lai | G06Q 10/06 705/7.13 |
| 2007/0050230 A1 * | 3/2007 | Umagat | G06Q 30/012 705/26.2 |
| 2008/0010270 A1 | 1/2008 | Gross | |
| 2008/0147487 A1 | 6/2008 | Hirshberg | |
| 2008/0209320 A1 | 8/2008 | Mawhinney et al. | |
| 2010/0125502 A1 | 5/2010 | Solomon et al. | |
| 2010/0217757 A1 | 8/2010 | Fujioka | |
| 2010/0241576 A1 | 9/2010 | Beeri | |
| 2011/0209067 A1 | 8/2011 | Bogess et al. | |
| 2011/0258204 A1 | 10/2011 | Hubbard et al. | |
| 2012/0257733 A1 * | 10/2012 | Kosseifi | G06Q 10/06311 379/93.17 |
| 2012/0290407 A1 | 11/2012 | Hubbard et al. | |
| 2013/0090963 A1 * | 4/2013 | Sharma | G06Q 10/063112 705/7.13 |
| 2014/0172482 A1 * | 6/2014 | Mitchell | G06Q 10/06 705/7.15 |
| 2015/0356520 A1 * | 12/2015 | Mitti | G06Q 10/087 705/305 |
| 2017/0278041 A1 * | 9/2017 | LaReau | G06Q 10/063114 |
| 2017/0372534 A1 * | 12/2017 | Steketee | G06Q 10/087 |
| 2018/0005461 A1 * | 1/2018 | Steketee | G06Q 10/087 |
| 2018/0308049 A1 * | 10/2018 | Katz | G06Q 10/0875 |

OTHER PUBLICATIONS

Final Office Action for U.S. Appl. No. 12/356,429, dated May 2, 2012.

Notice of Allowance for U.S. Appl. No. 12/819,402, dated May 14, 2012.

Non-Final Office Action for U.S. Appl. No. 13/453,802, dated Jun. 8, 2012.

Linear Combination-Wikipedia (http://en.wikipedia.org/wiki/Linear_Combination (accessed Jul. 16, 2012).

* cited by examiner

TECHNICAL FIELD SERVICE INVENTORY MANAGEMENT

TECHNICAL FIELD

Embodiments of the subject matter described herein relate generally to inventory management. More particularly, embodiments of the subject matter relate to inventory management of technical field service products.

BACKGROUND

Inventory management is a critical activity for all businesses. This is especially true for organizations that provide technical field service to a customer's remote worksite. Ensuring that field service technicians are equipped with proper inventory to complete their work is clearly important. Additionally, tracking this inventory is challenging since inventory management typically requires a manual accounting of existing and consumed inventory over the course of various work taskings. Accordingly, it is desirable to provide technical field service inventory management that is automatically updated as technical work taskings are completed. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

A method and system for providing technical field service inventory management has been developed. Product inventory is monitored and accounted for with a software platform that provides an automatic and continuous inventory status as products are consumed by the field service technician in completing a work tasking. The software platform is server-based and coupled to a communications network. The server-based platform creates various "objects" that categorize, track and account for the product inventory. An "object" is a variable data structure that is stored in a retrievable electronic memory medium. The object may be a combination of variables, functions and data structures.

In some embodiments, the software platform creates a "work order" object that specifies the work tasking for the field service technician. A "product required" object may be created that specifies a product necessary for the field service technician to complete the work tasking. Also, a "location" object may be created that specifies the location of the product inventory for the work tasking in addition to an "address/appointment" object that specifies directions to the worksite and a time to begin the work tasking. Further, a "product item" object may be created that specifies a specific unit of product inventory to be used by the field service technician to complete the work tasking. A "product item" object may be created that specifies the quantity and designated use of the specific unit of product inventory. Finally, a "product item consumed" object may be created that specifies that the field service technician has used the product inventory to complete the work tasking. This object may require affirmative confirmation by the field service technician of the products consumption before being created. The status of the product inventory is automatically updated based on the product item consumed object.

Figure 1:
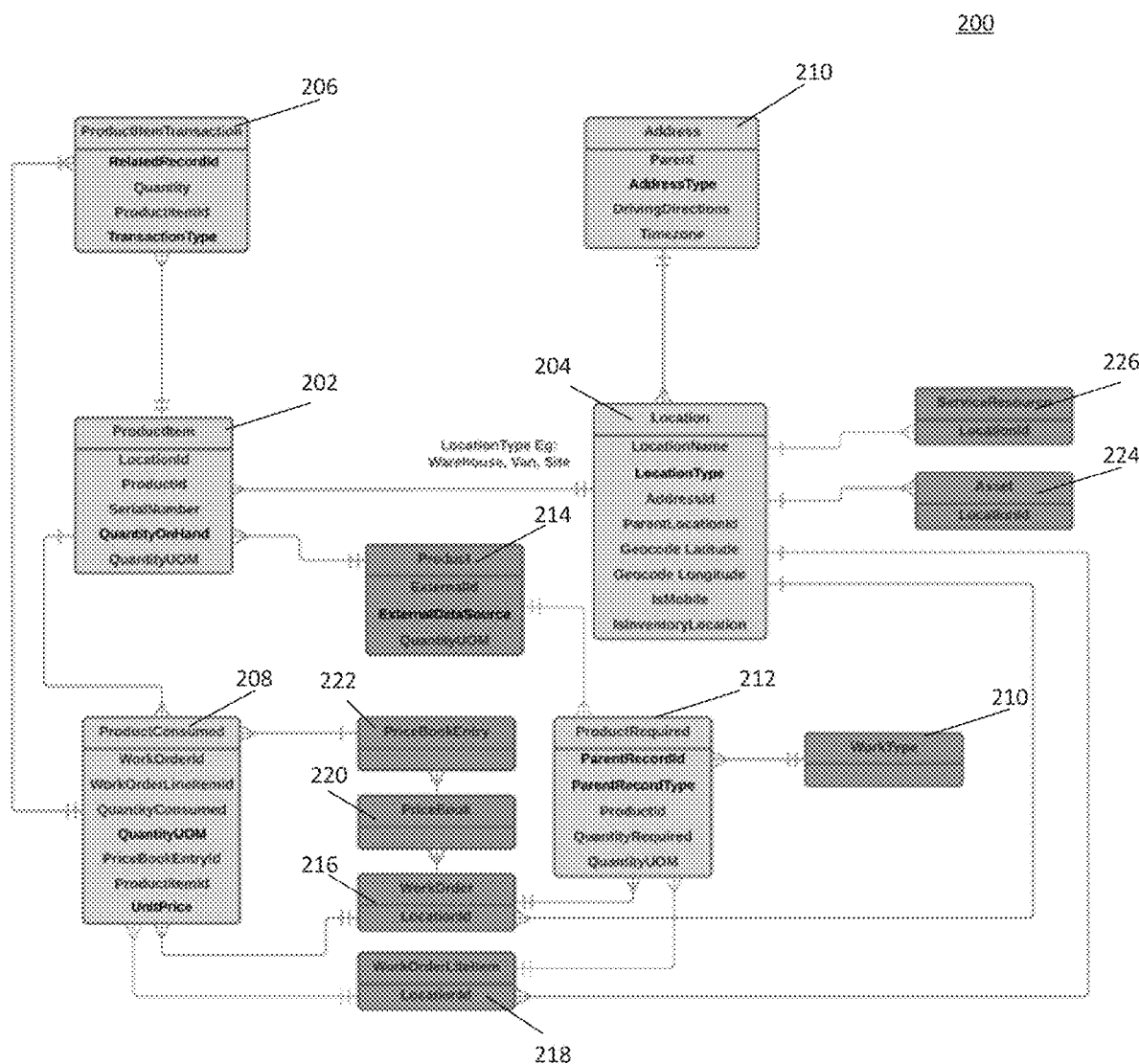
FIG. 1 is a block diagram showing the relationship of objects created by a server-based software platform for technical field service inventory management in accordance with one embodiment.

Turning now to FIG. 1, a block diagram 200 is shown of the relationships of objects created by the server-based software platform for technical field service inventory management in accordance with one embodiment. In this embodiment, a "work order" object 216 is created with a server-based software platform. The work order object specifies the work tasking to be completed by a field service technician. Additionally, a "work order lite" object 218 may be created as an alternative or as an interim object for the sake of brevity or accelerated work requests. In this embodiment, both the work order and work order lite objects 216 and 218 both contain location data for the work tasking.

Once created, the work order object references a "work type" object 210 to determine the type and classification of work tasking to be completed. Examples of the type of work tasking may include: installation, repair, preventative maintenance, etc. Once the work type is determined, a "product required" object 212 is created by the software platform. The product required object contains such information as the product identification, the unit of measurement of the product, and the quantity required for the work task. In some embodiments, the quantity required may only be an estimate. In such a case, an estimate of the quantity may include additional inventory of the product required in order to compensate for any errors in the estimate that may occur.

Once the product required object 212 has been created, a specific product object 214 is identified and used to create a "product item" object 202 with the software platform. The product item object 202 identifies the specific product needed for use to complete the work tasking. It is used to track which product is available, at what location and in what quantity. This object includes data such as the identification of the product needed, the unit of measurement for the product, the quantity of the product on hand, a serial number or other identifying features of a specific product, and the specific products' location. It should be clear that this data may vary in content and form based upon the type of product used for the work tasking. For example, the product may be a specific repair part that is identified by serial number. In other cases, the product may be a substance that is identified by volume (e.g., lubricating oil). Volumetric substances may be identified by individual containers such as bottles or cans or alternatively in bulk and identified by a specific volume.

Once the product item object 202 has been created, a "location" object 204 is created that provides the location name and address of the product. This data indicates the inventory location, whether it is mobile, specific location coordinates (e.g., latitude and longitude). Examples of a type of location may include a warehouse, a mobile technical service van or other type vehicle, or an on-site inventory supply facility that is located on the worksite. The location object 204 also may receive data from an "asset" object 224 and a "service resource" object 226 that provide additional data about the resources and assets located at the inventory location.

In addition to the location object, an "address" object 210 is created that is used to store the physical address of the worksite location. This object may also include a schedule for an appointment for the field service technician to begin the work tasking. This object may include such data as driving directions to the worksite, the time of the appointment, the address type (e.g., construction site). The address object may be consolidated with the location object in alternative embodiments.

In some embodiments, the product required object, the product item object, the location object, and the address/appointment object may all be used for inventory management of a fleet of field service vans. These objects may be used to plan loading of individual and multiple service vehicles prior to dispatch to different worksites. These objects may also be used to coordinate restocking and resupply of product inventory at a worksite.

Once the product item object 202, the location object 204, and the address/appointment object 210 are created, the software platform creates a "product item transaction" object 206. This object enables auditing of any inventory location. It tracks items that were replenished to a specific inventory location, consumed from a specific inventory location, transferred to or from an inventory location, or restocked at an inventory location. This object includes such data as the product identification, the unit of measurement of the product, the quantity of product present, and the transaction type. Examples of the transaction type may include: inventory replenishment, inventory consumption, inventory restocking or transfer.

A "product item consumed" object is created by the software platform upon consumption of the product by the field service technician during completion of the work tasking. This object includes data such as the work order, the work order line item that required the consumption of the product, the unit of measurement of the product, the quantity of product consumed, identification of the specific product consumed, a unit price of the product, and a price book entry reflecting the cost of the product consumed. The unit price of the product is retrieved from a price book object 220 along with a price book entry object 222. This information may provide information needed for billing a customer for the work tasking performed by the field service technician. Prior to creating the product item consumed object, an affirmative confirmation may be required from the field service technician that the product was actually consumed during the completion the work tasking. This confirmation may be obtained from the field service technician with the use of a mobile electronic communications device such as a mobile phone or tablet device that is connected to the software platform via a communications link.

Once the product item consumed object is created, the status of the product inventory is automatically updated with the software platform. In this manner, an accurate continuous inventory of product items on hand is available. In other embodiments, the product item consumed object may be integrated into an inventory management system of the customer for whom the work tasking was performed. This allows the customer to access and track the usage of products consumed on their worksite.

Figure 2:
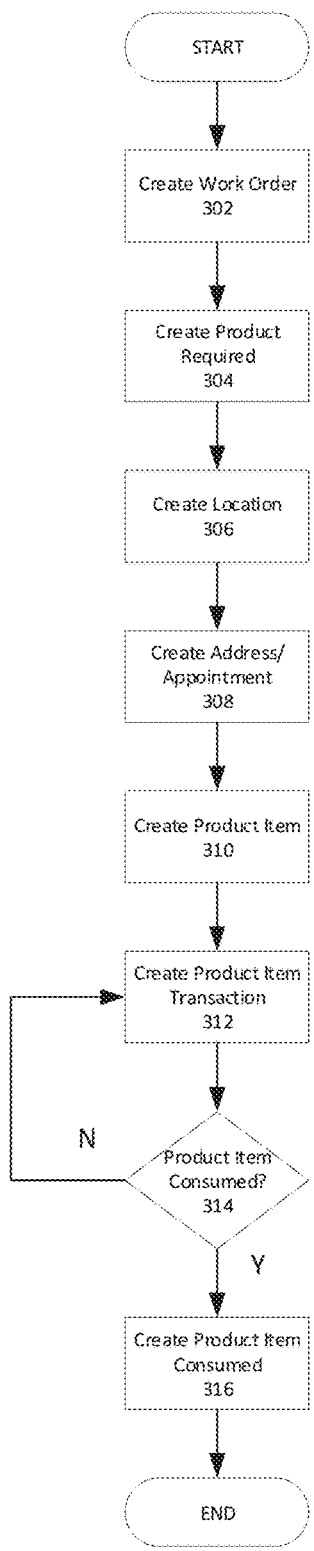
FIG. 2 is a flowchart showing a method for technical field service inventory management in accordance with one embodiment.

Turning now to FIG. 2, a flowchart 300 is shown of a method for technical field service inventory management in accordance with one embodiment. The method is used to manage a source of product inventory for use by field service technician. First, a "work order" object is created 302 with a server-based software platform. This object specifies a work tasking assignment for the field service technician. Next, a "product required" object is created 304 with the server-based software platform. The product required object specifies which product is necessary for the field service technician to complete the work tasking. Next, a "location" object is created 306 by the software platform. The location object specifies the location of the worksite and the product necessary for the work tasking. Also, an "address/appointment" object is created 308 by the software platform. The address/appointment object specifies the address of the worksite and a time to begin the work tasking. The product required object in combination with the location object are used to create a "product item" object 310. This object specifies a specific unit of product inventory to be used by the field service technician to complete the work tasking and its location. Additionally, a "product item transaction" object is created 312 that specifies the quantity and designated use of the unit of product inventory.

Once the field service technician completes the work tasking, the technician is queried on whether the product item was used or "consumed" in accomplishing the work tasking 314. If the field service technician affirmatively confirms the use of the product item, a "product item consumed" object is created 316. This provides a continuous automatic updating of the inventory status of the product inventory source with the software platform. This embodiment has the advantage of providing inventory management for technical field service personnel and resources that allows coordination across multiple inventory sources such as a fleet of technical service vans. The embodiment optimizes inventory management by coordinating inventory replenishment, planning and accounting for inventory consumption, and inventory transfer and restocking.

It would be advantageous to analyze the images posted across a data group to identify points of interest and detect positive usage trends across groups. Embodiments of the subject matter described herein generally relate to techniques for processing and analysis of posted online images. More particularly, embodiments of the subject matter relate to identifying positive usage trends based on analysis of posted online images. The disclosed embodiments described below may be implemented in a wide variety of different computer-based systems, architectures and platforms which may include a multi-tenant system. Additionally, the disclosed embodiments may be implemented using mobile devices, smart wearable devices, virtual systems, etc.

Figure 3:
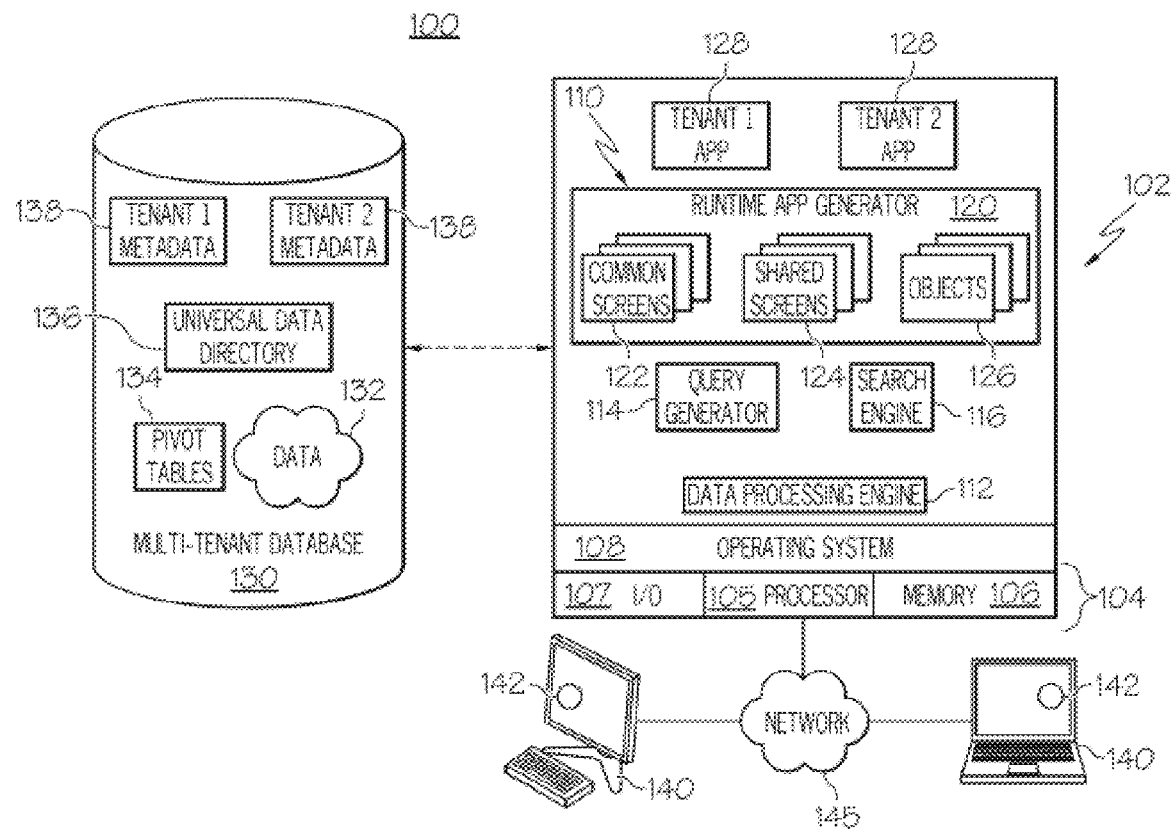
FIG. 3 is a schematic block diagram of an exemplary multi-tenant computing environment.

Turning now to FIG. 3, an exemplary multi-tenant system 100 includes a server 102 that dynamically creates and supports virtual applications 128 based upon data 132 from a database 130 that may be shared between multiple tenants, referred to herein as a multi-tenant database. Data and services generated by the virtual applications 128 are provided via a network 145 to any number of client devices 140, as desired. Each virtual application 128 is suitably generated at run-time (or on-demand) using a common application platform 110 that securely provides access to the data 132 in the database 130 for each of the various tenants subscribing to the multi-tenant system 100. In accordance with one non-limiting example, the multi-tenant system 100 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 130. In this regard, each tenant includes one or more users associated with, assigned to, or otherwise belonging to that respective tenant. Stated another way, each respective user within the multi-tenant system 100 is associated with, assigned to, or otherwise belongs to a particular one of the plurality of tenants supported by the multi-tenant system 100. Tenants may represent companies, corporate departments, business or legal organizations, and/or any other entities that maintain data for particular sets of users (such as their respective customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other tenants.

The multi-tenant database 130 may be a repository or other data storage system capable of storing and managing the data 132 associated with any number of tenants. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein. In an exemplary embodiment, the database 130 includes a database management system or other equivalent software capable of determining an optimal query plan for retrieving and providing a particular subset of the data 132 to an instance of virtual application 128 in response to a query initiated or otherwise provided by a virtual application 128, as described in greater detail below. The multi-tenant database 130 may alternatively be referred to herein as an on-demand database, in that the multi-tenant database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like. The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 3, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 3, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below. Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

"Node/Port"—As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node). As used herein, a "port" means a node that is externally accessible via, for example, a physical connector, an input or output pin, a test probe, a bonding pad, or the like.

"Connected/Coupled"—The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The various tasks performed may be performed by software, hardware, firmware, or any combination thereof. For illustrative purposes, the description may refer to elements mentioned above in connection with FIGS. 1 and 2. In practice, portions may be performed by different elements of the described system, e.g., component A, component B, or component C. It should be appreciated that any number of additional or alternative tasks, the tasks shown in FIG. 2 need not be performed in the illustrated order, and the method may be incorporated into a more comprehensive procedure or process having additional functionality not described in detail herein. Moreover, one or more of the tasks shown in FIG. 2 could be omitted from an embodiment as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for technical field service inventory management, comprising:

providing a source of product inventory for use by a field service technician, where the source of product inventory is a supply facility located on a worksite;

creating a work order object with a server-based software platform, where the work order object specifies a work tasking for the field service technician;

creating a product required object with the server-based software platform, where the product required object specifies a product necessary for the field service technician to complete the work tasking;

creating a product item object with the server-based software platform, where the product item object specifies a specific unit of product inventory to be used by the field service technician to complete the work tasking and an estimated quantity of the product necessary to complete the work tasking;

creating a location object with the server-based software platform, where the location object specifies a location of product inventory for the work tasking;

creating an address/appointment object with the server-based software platform, where the address/appointment object specifies an address of the worksite and a time to begin the work tasking;

creating a product item transaction object with the server-based software platform, where the product item transaction object specifies the estimated quantity of the specific unit of product inventory used to complete the work tasking and designated use of the specific unit of product inventory by the field service technician to complete the work tasking;

creating a product item consumed object with the server-based software platform, where the product item consumed object specifies that the field service technician has affirmatively confirmed the use of the unit of product inventory to complete the work tasking, where the product item consumed object comprises an identification of a work order, a unit of measurement of the product, a quantity of the product consumed, a unit price of the product, and a price book entry reflecting a cost of the product consumed to complete the work tasking; and updating an inventory status for the source of product inventory with the server-based platform to reflect the usage of the product inventory.

2. The method of claim 1, where the source of product inventory comprises a warehouse.

3. The method of claim 1, where the source of product inventory is a service vehicle driven by the field service technician.

4. The method of claim 3, where the service vehicle is part of a fleet of service vehicles.

5. The method of claim 1, where the work order object comprises information regarding a type of the work tasking.

6. The method of claim 1, where the product required object comprises a product identification and a unit of measurement for the product, and an estimated quantity required to complete the work tasking.

7. The method of claim 1, where the location object comprises a name of the worksite, a type of the worksite, a geographic location of the worksite, and a location for the product necessary to complete the work tasking.

8. The method of claim 1, where the address/appointment object comprises driving directions to the worksite.

9. The method of claim 1, where the address/appointment object is combined with the location object.

10. The method of claim 1, where the product item object comprises the location of the product, a product identification, a serial number of the product, a unit of measurement of the product, and a quantity of the product on hand.

11. The method of claim 1, where the product item transaction comprises a product identification, an estimated quantity of the product to be used to complete the work tasking, and a classification type of the work tasking.

12. The method of claim 1, where the field service technician confirms consumption of the unit of product inventory with a mobile communications device.

13. The method of claim 1, where the product required object is used to plan loading of product inventory into a service vehicle prior to dispatch to the worksite.

14. The method of claim 1, where the product item consumed object is integrated into an inventory management system of a customer.

15. A system for technical field service in an inventory management, comprising:
- a field service van with product inventory for use by a field service technician, where a source of product inventory is a supply facility located on a worksite;
- a computing device coupled to a communications network, where the computing device is loaded with a software platform that is capable of,
  creating a work order object, where the work order object specifies a work tasking for the field service technician,
  creating a product required object, where the product required object specifies a product necessary for the field service technician to complete the work tasking,
  creating a product item object, where the product item object specifies a specific unit of product inventory to be used by the field service technician to complete the work tasking and an estimated quantity of the product necessary to complete the work tasking,
  creating a location object, where the location object specifies a location of a product inventory for the work tasking, creating an address/appointment object, where the address/appointment object specifies an address of the worksite and a time to begin the work tasking,
  creating a product item transaction object, where the product item transaction object specifies the estimated quantity of the specific unit of product inventory used to complete the work tasking and designated use of the specific unit of product inventory by the field service technician to complete the work tasking, and
  creating a product item consumed object with the server-based platform, where the product item consumed object specifies that the field service technician has affirmatively confirmed the use of the unit of product inventory to complete the work tasking,
  where the product item consumed object comprises an identification of a work order, a unit of measurement of the product, a quantity of the product consumed, a unit price of the product, and a price book entry reflecting a cost of the product consumed to complete the work tasking, and
  updating an inventory status for the source of product inventory with the server-based platform to reflect the usage of the product inventory;
- a mobile computing device coupled to the communications network, where the field service technician confirms consumption of the unit of product inventory with the mobile computing device.

16. The system of claim 15, where the product item consumed object is integrated into an inventory management system of a customer.

17. The system of claim 15, where the computing device is in communication with a fleet of field service vans through the communications network.

* * * * *